US012097697B2

(12) United States Patent
Hamade et al.

(10) Patent No.: US 12,097,697 B2
(45) Date of Patent: Sep. 24, 2024

(54) INK JET RECORDING HEAD (71) Applicant: CANON KABUSHIKI KAISHA, Tokyo (JP)

(72) Inventors: Yohei Hamade, Tokyo (JP); Isao Imamura, Kanagawa (JP); Sachiko Yamauchi, Kanagawa (JP); Songhee Kim, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 17/725,997

(22) Filed: Apr. 21, 2022

(65) Prior Publication Data
US 2022/0348011 A1 Nov. 3, 2022

(30) Foreign Application Priority Data

Apr. 28, 2021 (JP) ................................ 2021-075768
Mar. 31, 2022 (JP) ................................ 2022-058992

(51) Int. Cl.
| B41J 2/14 | (2006.01) |
| C09D 11/03 | (2014.01) |
| C09D 11/30 | (2014.01) |
| C09J 11/04 | (2006.01) |
| C09J 11/08 | (2006.01) |
| C09J 163/10 | (2006.01) |

(52) U.S. Cl.
CPC ........ *B41J 2/14* (2013.01); *B41J 2002/14362* (2013.01); *B41J 2202/19* (2013.01); *B41J 2202/20* (2013.01); *C09D 11/03* (2013.01); *C09D 11/30* (2013.01); *C09J 11/04* (2013.01); *C09J 11/08* (2013.01); *C09J 163/10* (2013.01)

(58) Field of Classification Search
CPC ............... B41J 2/14; B41J 2002/14362; B41J 2202/19; B41J 2202/20; C09D 11/03; C09D 11/30; C09J 11/04; C09J 11/08; C09J 163/10
See application file for complete search history.

(56) References Cited

U.S. PATENT DOCUMENTS

| 5,450,110 A | 9/1995 | Sato et al. |
| 9,359,538 B2 | 6/2016 | Tsutsui et al. |
| 2007/0252863 A1 | 11/2007 | Sun et al. |
| 2007/0256709 A1 | 11/2007 | Shang et al. |

(Continued)

FOREIGN PATENT DOCUMENTS

| CA | 2007393 A1 | 7/1990 |
| CN | 101062616 A | 10/2007 |

(Continued)

OTHER PUBLICATIONS

First Office Action in Chinese Application No. 202210461241.0 (May 2024).

*Primary Examiner* — Geoffrey S Mruk
(74) *Attorney, Agent, or Firm* — Venable LLP (57) ABSTRACT An ink jet recording head that includes a substrate having an ejection orifice for ejecting a liquid and a member provided with a recessed portion for accommodating the substrate, the head including a gap formed between a wall of the recessed portion of the member and the substrate, and a sealing material that seals the gap, in which the sealing material contains a cured product of a composition containing at least a hydrogenated bisphenol A type epoxy resin, a solid basic compound, and polythiol.

18 Claims, 3 Drawing Sheets (56) References Cited

U.S. PATENT DOCUMENTS

| | | |
|---|---|---|
| 2007/0263026 A1 | 11/2007 | Shang et al. |
| 2012/0098885 A1 | 4/2012 | Harada et al. |
| 2018/0354264 A1* | 12/2018 | Yamauchi ............... B05D 7/16 |
| 2021/0031523 A1 | 2/2021 | Ishizuka et al. |
| 2021/0221137 A1 | 7/2021 | Horiuchi et al. |
| 2021/0221964 A1 | 7/2021 | Imamura et al. |
| 2021/0222000 A1 | 7/2021 | Yamaji et al. |
| 2021/0229437 A1 | 7/2021 | Ishizuka et al. |

FOREIGN PATENT DOCUMENTS

| | | | | |
|---|---|---|---|---|
| CN | 109016842 A | 12/2018 | | |
| JP | 2904629 B2 | 6/1999 | | |
| JP | 2002-155129 A | 5/2002 | | |
| JP | WO 2020/080390 A1 * | 4/2020 | ............. | C09J 11/06 |

\* cited by examiner

INK JET RECORDING HEAD

BACKGROUND OF THE INVENTION

Field of the Invention

The present disclosure relates to an ink jet recording head in which components constituting the ink jet recording head are sealed with a sealing material.

Description of the Related Art

An ink jet recording head is a device that has a plurality of energy generating elements and ejects a liquid from a plurality of ejection orifices by energy applied from the energy generating elements. An example of the ink jet recording head is an ink jet recording head mounted on an ink jet recording device that records by ejecting ink onto a recording paper.

The ink jet recording head includes various components such as a substrate having an ejection orifice for ejecting ink and electrical wiring for electrically controlling ejection, and the like. In the ink jet recording head, after assembling various components, a gap is filled with a sealing material in order to prevent ink from entering the gap between the components.

As such a sealing material, Japanese Patent No. 2904629 describes a sealing material containing a urethane resin obtained by reacting a polyol compound with an isocyanate compound.

SUMMARY OF THE INVENTION

Various performances are required for a sealing material used for an ink jet recording head. For example, insulation is required when sealing electrical wiring, ink resistance is required at a portion to which ink adheres, and wipe resistance is required during cleaning.

Furthermore, in recent years, an aspect of the ink jet recording head has changed in various ways, and it is necessary to have a sealing property suitable for a shape and a material of an adhered member. Therefore, low viscosity and flatness are also required in order to pour evenly between thin members. In addition, in a structure in which the adhered member is elongated like a long head, there is a concern that the adhered member may be deformed due to a difference in a linear expansion coefficient between the adhered member and the sealing material. Therefore, low temperature curability is also required so that the member does not deform.

On the other hand, in terms of productivity, a material that can shorten a maintenance time of equipment is required. In the case of a two-liquid mixing dispenser, since a mixing portion is used repeatedly, a cleaning step takes time and the productivity drops. In addition, it is desirable that a pot life of the sealing material is long from the viewpoint of tacticity and stability when the material is used. In addition, it is desirable that the pot life of the sealing material is long and cures in a short time from the viewpoint of stability and productivity when the material is used.

A urethane resin obtained by reacting a general polyol compound with an isocyanate compound as described in Japanese Patent No. 2904629 may not be sufficiently satisfied with these requirements.

Therefore, an object of the present disclosure is to provide an ink jet recording head sealed with a sealing material having an excellent sealing property, moldability and productivity.

According to an aspect of the present disclosure, there is provided an ink jet recording head that includes a substrate having an ejection orifice for ejecting a liquid and a member provided with a recessed portion for accommodating the substrate, the head including a gap formed between a wall of the recessed portion of the member and the substrate, and a sealing material that seals the gap, in which the sealing material contains a cured product of a composition containing at least a hydrogenated bisphenol A type epoxy resin, a solid basic compound, and polythiol.

In addition, according to another aspect of the present disclosure, there is provided a suitable method of manufacturing a sealing material used in the ink jet recording head, as described below.

A method of manufacturing a sealing material, the method including kneading a hydrogenated bisphenol A type epoxy resin and a solid basic compound to manufacture a mixture 1, and kneading the mixture 1 and polythiol to manufacture a mixture 2.

A method of manufacturing a sealing material, the method including kneading a hydrogenated bisphenol A type epoxy resin and a solid basic compound to manufacture a mixture 1, kneading a hydrogenated bisphenol A type epoxy resin and a silica filler to manufacture a mixture 3, and kneading the mixture 1, the mixture 3 and polythiol to manufacture a mixture 4.

A method of manufacturing a sealing material, the method including kneading a hydrogenated bisphenol A type epoxy resin and a solid basic compound to manufacture a mixture 1, kneading a hydrogenated bisphenol A type epoxy resin, a silica filler, and polythiol to manufacture a mixture 5, and kneading the mixture 1 and the mixture 5 to manufacture a mixture 6.

In addition, according to still another aspect of the present disclosure, there is provided a method of manufacturing an ink jet recording head, the method including using the sealing material manufactured by the manufacturing method.

Further features of the present invention will become apparent from the following description of exemplary embodiments with reference to the attached drawings.

DESCRIPTION OF THE EMBODIMENTS

Hereinafter, embodiments of the present disclosure will be described in detail.
<Ink Jet Recording Head>

Figure 1:
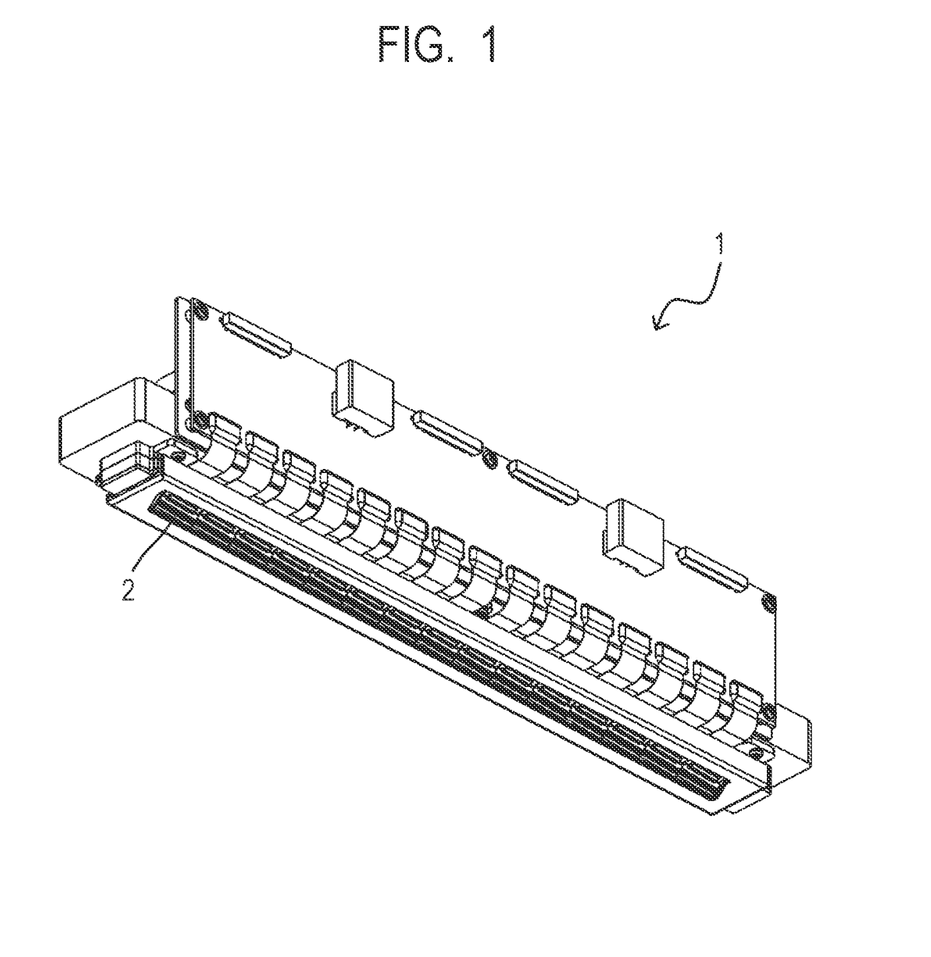
FIG. 1 is a perspective view illustrating an aspect of an ink jet recording head.
Figure 2A:
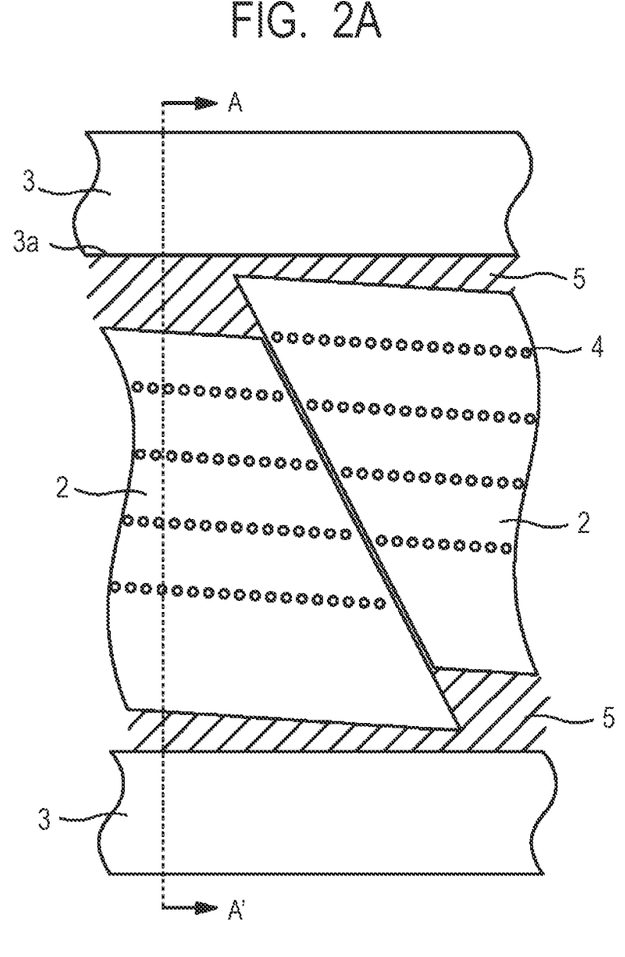
FIG. 2A is a partially enlarged view of the ink jet recording head.
Figure 2B:
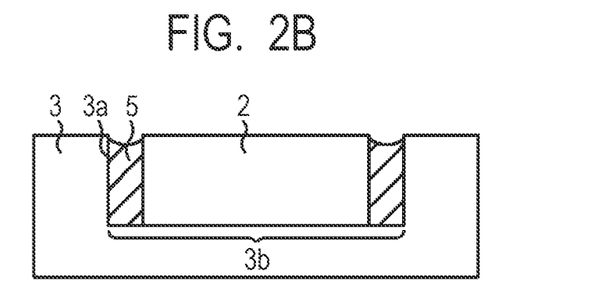
FIG. 2B is a cross-sectional view taken along the line A-A' illustrated in FIG. 2A.

First, a configuration of the ink jet recording head in the present disclosure will be described with reference to the drawings. FIG. 1 is a perspective view of an aspect of the ink jet recording head in the present disclosure. FIG. 2A is a partially enlarged view of the ink jet recording head, and FIG. 2B is a cross-sectional view of the ink jet recording head taken along the line A-A' illustrated in FIG. 2A.

The ink jet recording head 1 includes a substrate 2 and a member 3 that supports the substrate 2. The substrate 2 includes an ejection orifice 4 for ejecting ink, an energy generating element (not illustrated) for generating energy for ejecting ink and an electronic circuit element (not illustrated) for controlling the energy generating element.

The ink jet recording head 1 is a so-called line type head capable of high-speed printing. The line type head refers to an ink jet recording head having a width equal to or larger than a width of a recording paper and in which a plurality of substrates 2 is arranged in-line along a width direction. The plurality of substrates 2 are continuously arranged on the ink jet recording head 1 with a length equal to or larger than the width of the recording paper, so that recording can be performed in all areas in the width direction of the recording paper only by passing the recording paper once, with the ink jet recording head fixed. Here, a width of a short side of the A 4 paper is assumed as the width of the recording paper.

The plurality of substrates 2 arranged in-line is accommodated in a recessed portion 3b provided in the member 3. When the ink jet recording head 1 is viewed from a surface side where the ejection orifice is open, a gap is formed between the substrate 2 and the side wall 3a of the recessed portion 3b of the member 3. In addition, there may be a gap between the substrates 2. These gaps are sealed by a sealing material 5. The sealing material 5 is formed by pouring a composition for a sealing material into the gap between the substrate 2 and the side wall 3a of the recessed portion 3b of the member 3 and curing the composition.

<Composition for Sealing Material>

Next, the composition for the sealing material will be described below. The epoxy resin composition for the sealing material used in the present disclosure contains at least a hydrogenated bisphenol A type epoxy resin, a solid basic compound, and polythiol.

The above composition is a composition having an appropriate sealing property, moldability and productivity so as to be a desired sealing material. First, the performance of the above composition will be described.

Sealing Property

The sealing material used in the ink jet recording head is required to have ink resistance against ink contact and wipe resistance against cleaning. The sealing material used in the present disclosure is cured by thiol curing (anionic polymerization reaction) with polythiol contained in the composition, and functional groups contributing to adhesion such as hydroxyl groups remain even after curing. In addition, thiol-derived-S— is flexible and can be expected to have strong adhesive force to the adhered member even in a harsh environment. Therefore, it is possible to prevent ink that permeates from an interface between the adhered member and the sealing material from intruding. In addition, since the epoxy resin is used, excellent mechanical strength can be obtained and wipe resistance can be ensured.

Moldability

Since it is necessary to pour the sealing material into the recessed portion 3b having a narrow width of several tens of μm to several mm between the plurality of substrates 2 arranged in-line as illustrated in FIGS. 2A and 2B, it is preferable that the sealing material has a low viscosity. The viscosity of the sealing material is preferably 40 Pa·s or less. In addition, it is desirable that the sealing material has low elasticity so as not to generate stress on the head member due to the temperature rise during the mounting step of the ink jet recording head or the printing by the printer. From such a point, the elastic modulus of the sealing material is preferably 20 GPa or less, and more preferably 10 GPa or less. As the sealing material used in the present disclosure, a hydrogenated bisphenol A type epoxy resin is used as the epoxy resin from the viewpoint of low viscosity and low elasticity.

In addition, in an aspect in which the area to be sealed by the sealing material is large, when the thermosetting is performed at a high temperature, there is a risk of deformation of the adhered material or damage to components due to the difference in linear expansion with the adhered material. Therefore, a composition that can be cured at room temperature or at a low temperature of 100° C. or lower is effective. Since the reaction rate of an epoxy resin due to anionic polymerization is normally slow, the sealing material according to the present disclosure is improved in reactivity by adding polythiol as a curing agent.

Productivity

Storage stability is required for productivity. It is desirable that a pot life is 8 hours or more at room temperature, but the pot life of the one-liquid sealing material is normally shorter than the pot life of the two-liquid sealing material. When the present sealing material contains the hydrogenated bisphenol A type epoxy resin, the solid basic compound and the polythiol, a sufficient pot life can be obtained. In order to delay the curing reaction and obtain a more sufficient pot life, as described later, a method of first mixing a hydrogenated bisphenol A type epoxy resin and a solid basic compound, and mixing the obtained mixture with polythiol is preferable. This is because when the epoxy resin and the solid basic compound are mixed first, the solid basic compound is coated with the epoxy resin. As a result, it takes time for the solid basic compound to dissolve in polythiol. As a result, this is because the time until the reaction between the epoxy resin and the polythiol starts can be delayed. Therefore, the viscosity of one liquid increases slowly even at room temperature, and a sufficient pot life can be obtained. The definition of the pot life is the time that can be left at room temperature, which is twice the numerical value of the viscosity immediately after mixing.

Next, each of the constituent components of the composition for the sealing material will be described.

(Epoxy Resin))

The epoxy resin is the main agent (the most abundant curing component in the composition), and hydrogenated bisphenol A type epoxy resin is used. The hydrogenated bisphenol A type epoxy resin does not contain double bonds and aromatic rings and has a small molecular weight distribution as a configuration for reducing elasticity. In addition, from the viewpoint of reducing the viscosity, the hydrogenated bisphenol A type epoxy resin is preferably a high-purity resin, and the post-hydrogenated bisphenol A type epoxy resin formed by the post-hydrogenation method is more preferable.

Furthermore, from the viewpoint of storage stability, the epoxy resin is preferably an alicyclic epoxy resin. This is because the alicyclic epoxy resin is effective in extending the pot life because the reactivity is lowered in the anionic polymerization system. In addition, as described above, in order to cover the solid basic compound with the hydrogenated bisphenol A type epoxy resin, it is effective that the epoxy resin is in a liquid state. In a case where a solid epoxy resin is used at room temperature, the solid basic compound may be heated to a temperature at which the solid basic compound does not melt to make the solid basic compound liquid, or it may be dissolved in another liquid epoxy resin. Specific examples of the epoxy resin include jER YX8000, YX8000D, YX8034 and YX8040 as hydrogenated epoxy resin series manufactured by Mitsubishi Chemical Corporation.

The hydrogenated bisphenol A type epoxy resin may be one type or may contain two or more types.

(Polythiol))

Polythiol functions as a curing agent. The polythiol is not particularly limited, but a polythiol having high reactivity and a relatively low molecular weight is normally selected. As such a polythiol, one that is liquid at room temperature can be desirably used.

Examples thereof include pentaerythritol trispropanethiol (PEPT), trimethylolpropane tris (3-mercaptopropionate) (TMMP), pentaerythritol tetrakis (3-mercaptopropionate), P-xylenedithiol, and the like.

As examples of the commercially available product include PEPT (manufactured by SC Organic Chemical Co., Ltd.), TMMP (manufactured by SC Organic Chemical Co., Ltd.), Cup Cure 3-800 (trade name, manufactured by Mitsubishi Chemical Corporation), QX11 (trade name, manufactured by Mitsubishi Chemical Corporation), and the like.

In a case where the sealing material of the present disclosure is used in a portion requiring more chemical resistance, a polythiol with an ether skeleton having a more chemical resistance, and particularly an ether-type polyfunctional thiol is preferable. Polythiol with an ether skeleton refers to a compound having two or more thiol groups in the side chain, not containing a hydrolyzable ester bond in the main chain, and having an ether bond with excellent properties such as chemical resistance due to the high bonding strength. In addition, polythiol having an ether skeleton is also effective in reducing the viscosity.

The content of polythiol is preferably such that the thiol equivalent of polythiol is 0.5 to 1 equivalent with respect to 1 equivalent of epoxy of the hydrogenated bisphenol A type epoxy resin. When the equivalent of polythiol to the epoxy resin is 0.5 equivalent or more, the reaction between the epoxy resin and the polythiol occurs at a sufficiently rapid rate, and curing can be performed in a short time. In addition, when the equivalent of polythiol is 0.5 equivalent or more, the polymerization reaction between the epoxy resin and the polythiol proceeds as a main reaction, and as a side reaction, the polymerization reaction between the epoxy resin and the base derived from the solid basic compound is unlikely to occur. As a result, the polythiol-derived thioether structure (—S—) necessary for obtaining flexibility is sufficiently formed, which is preferable from the viewpoint of adhesiveness. When the equivalent of polythiol with respect to the epoxy resin is 1 equivalent or less, the amount of unreacted polythiol that cannot react with the epoxy resin decreases. Deterioration of mechanical properties such as deterioration of adhesive force due to unreacted polythiol is prevented. In addition, even in a case where the sealing material is used in the portion in contact with the ink, the unreacted polythiol is prevented from being produced, so that the unreacted polythiol does not elute into the ink. Therefore, it is preferable because the sealing material is prevented from swelling with the ink.

(Solid Basic Compound))

The solid basic compound functions as a curing catalyst. The solid basic compound is not particularly limited as long as the solid basic compound is solid at room temperature, but a compound that is unlikely to dissolve in an epoxy resin is desirably used.

Examples thereof include dicyandiamide, a dihydrazide compound, solid aromatic amines such as diaminodiphenylmethane (DDM) and diaminodiphenylsulphon (DDS), various imidazoles, and various amine adduct-based latent curing agents that are normally used as latent curing agents. In particular, an amine adduct-based latent curing agent is used as a compound suitable for curing an epoxy resin.

The preferred content range of solid basic compound depends on the usage conditions.

For example, the content of the solid basic compound is preferably 1.5 to 2.5 parts by mass with respect to 100 parts by mass of the hydrogenated bisphenol A type epoxy resin. When the content of the solid basic compound with respect to the epoxy resin is 1.5 parts by mass or more, curing can be performed in a short time. When the content of the solid basic compound with respect to the epoxy resin is 2.5 parts by mass or less, the solid basic compound is sufficiently coated with the epoxy resin, the amount of the solid basic compound dissolved in polythiol is reduced, and a sufficient pot life can be obtained. In addition, when the usage conditions require rapid curing at a low temperature of approximately room temperature, it is preferable that the content of the solid basic compound is 2.5 to 10 parts by mass with respect to 100 parts by the hydrogenated bisphenol A type epoxy resin. When the content of solid basic compound to epoxy resin is 2.5 parts by mass or more, sufficient acceleration of curing can be expected, and when the content of solid basic compound to epoxy resin is 10 parts by mass or less, the amount of the non-curing component is appropriate.

(Silane Agent (Silane Coupling Agent))

A silane agent may be further added to the sealing material according to the present disclosure. It is preferable to add a silane agent having a low molecular weight as a configuration for reducing the viscosity. As the silane agent, one having a molecular weight of 500 or less, and preferably a molecular weight of 300 or less can be used. In addition, as the silane agent to be added, a compound having an alicyclic epoxy skeleton having a characteristic of low viscosity is effective.

In addition, examples of preferred modifying groups of the silane agent include an epoxy group, a mercapto group, an isocyanate group and a fluorene skeleton. However, a basic silane coupling agent such as an amine compound acts as a catalyst, the reaction starts immediately, and the pot life is shortened, so that the basic silane coupling agent is not suitable to use.

In addition, in a case where the sealing material according to the present disclosure is used in a situation where stronger adhesiveness is required at the interface between the adhered member and the sealing material, the silane agent preferably has an epoxy group or a mercapto group.

In the sealing material according to the present disclosure, since the main agent is an epoxy resin and the curing agent is polythiol, the sealing material has good compatibility with these silane coupling agents, and it is considered that peeling at the interface between the adhered member and the sealing material is unlikely to occur.

The preferred content range of solid basic compound depends on the usage conditions.

For example, the content of the silane agent is preferably 1 to 50 parts by mass with respect to 100 parts by mass of the hydrogenated bisphenol A type epoxy resin. When the content of the silane agent with respect to the epoxy resin is 1 part by mass or more, the adhesion to the inorganic member can also be improved, and when the content is 50 parts by mass or less, it is possible to suppress the residual unreacted component of the silane agent. In addition, when the usage conditions require swelling resistance, pot life, and low viscosity, it is preferable that the content of the silane agent is 50 to 75 parts by mass with respect to 100 parts by the hydrogenated bisphenol A type epoxy resin. A compound having an inorganic component that does not easily swell, such as a silane agent and a silica filler described later, can be expected to improve swelling resistance depending on the amount added. In addition, since the silane agent has fewer reactive groups in one molecule than that of the epoxy resin, it can be expected to have the effect of prolonging the pot life. On the other hand, since the reactivity tends to be low, it is preferable to adjust the amount of thiol added, which is a curing agent, to achieve both pot life and curability.

The mixing order of the silane coupling agent is not particularly limited, but it is preferable that the epoxy group-containing silane coupling agent is mixed with the main epoxy resin and the mercapto group-containing silane coupling agent is mixed with the polythiol at the same timing.

(Other Additives)

Diluents and other additives may be optionally added to the composition for the sealing material containing the above components.

For example, the silica filler can be added as needed. By adding the silica filler, it is possible to impart the swelling resistance and storage stability which are the original performances of the silica filler. In addition, by adding the silica filler, the linear expansion coefficient can be suppressed, and the deformation of the adhered member can be suppressed. As the type of silica filler, a general-purpose one can be used, but a slightly larger micro silica filler (diameter of particle: approximately 10 µm to 100 nm) having a particle diameter of 0.1 µm or more, or macro silica filler (diameter of particle: approximately 100 µm to 10 µm) is preferable for the purpose of suppressing an increase in viscosity. The particle diameter represents the volume cumulative particle diameter D50 measured by the laser diffraction and scattering type particle size distribution measuring device.

In addition, for the purpose of enhancing the affinity with other materials, a silica filler treated with silane or the like is also suitable.

The content of the silica filler is preferably 100 to 800 parts by mass with respect to 100 parts by mass of the hydrogenated bisphenol A type epoxy resin. When the content of the silica filler with respect to the epoxy resin is 100 parts by mass or more, the swelling property can be suppressed, and when the content of the silica filler with respect to the epoxy resin is 800 parts by mass or less, the viscosity can be suppressed to a coatable viscosity.

In addition, for the purpose of coating the sealing material with high accuracy, a pigment may be added in order to detect the coating amount of the sealing material. For the pigment, a dispersant may be added so as to disperse well.

Next, a method of manufacturing a composition for a sealing material will be described.

(Method of Manufacturing Composition for Sealing Material)

In the method of manufacturing the sealing material according to the present disclosure, each raw material of the sealing material is mixed in the following order for the purpose of suppressing the dissolution of the solid basic compound in polythiol.

(Sealing Material not containing Silica Filler)

In the method of manufacturing the sealing material according to the present embodiment, a sealing material containing no silica filler is manufactured.

The manufacturing of the sealing material containing no silica filler can be performed in the following step order.

The method includes a step of kneading a hydrogenated bisphenol A type epoxy resin and a solid basic compound to manufacture a mixture 1, and a step of kneading the mixture 1 and polythiol to manufacture a mixture 2.

In the manufacturing method, it is particularly desirable to knead mixture 1 and the polythiol to produce mixture 2 within 1 hour after the manufacture of the mixture 1.

According to the manufacturing method, the viscosity is unlikely to increase even when stored at room temperature, and it has a sufficient pot life, as compared with the case where each component is kneaded together at once without taking the above order.

In particular, mixing the polythiol within 1 hour after the manufacture of mixture 1 can suppress the rapid increase in viscosity and extend a pot life.

(Sealing Material containing Silica Filler)

In the method of manufacturing the sealing material according to the present embodiment, a sealing material containing a silica filler is manufactured.

The manufacturing of the sealing material containing the silica filler includes two embodiments. The first embodiment can be performed in the following step order.

The method includes a step of kneading a hydrogenated bisphenol A type epoxy resin and a solid basic compound to manufacture a mixture 1, a step of kneading the hydrogenated bisphenol A type epoxy resin and silica filler to manufacture a first mixture 3, and a step of kneading the mixture 1, the mixture 3 and polythiol to manufacture a mixture 4.

In the manufacturing method, it is particularly preferred to mix the mixture 1 with the mixture 3 and polythiol within 1 hour after the mixture 1 to manufacture a mixture 4. According to the manufacturing method, the sealing material kneaded in this order has a longer pot life.

In particular, mixing the polythiol within 1 hour after the manufacture of mixture 1 can suppress the rapid increase in viscosity and extend a pot life.

The second embodiment can be performed in the following step order.

The method includes a step of kneading a hydrogenated bisphenol A type epoxy resin and a solid basic compound to manufacture a mixture 1, a step of kneading a hydrogenated bisphenol A type epoxy resin, a silica filler, and polythiol to manufacture a mixture 5, and a step of kneading the mixture 1 and the mixture 5 to manufacture a mixture 6.

In the manufacturing method, it is preferable to knead the hydrogenated bisphenol A type epoxy resin, the silica filler, and the polythiol to manufacture mixture 5, and to knead mixture 1 and mixture 5 to manufacture mixture 6 within 1 hour after the manufacture of the mixture 1.

According to the manufacturing method in this case, the silica filler increases the viscosity of the mixture 5 and further suppresses the contact between the solid basic compound coated with the hydrogenated bisphenol A type epoxy resin and the polythiol. In addition, a silane agent may be added to the mixture 5. The epoxy resin used in the above mixture can be appropriately adjusted as long as the amount of each mixture is mixed.

In particular, mixing the polythiol within 1 hour after the manufacture of mixture 1 can suppress the rapid increase in viscosity and extend a pot life.

EXAMPLE

Hereinafter, embodiments of the present disclosure will be described in more detail with reference to examples.

Examples 1 to 12 and Comparative Examples 1 and 2

<Preparation of Composition for Sealing Material>

Table 1 illustrates the materials used in Examples and Comparative Examples, the composition ratios of the materials, and the evaluation results.

In Examples 1 to 10, a hydrogenated bisphenol A type epoxy resin as a main agent and a solid basic compound as a catalyst are kneaded to obtain a mixture A. After 12 hours, the mixture B in which the same epoxy resin and silica filler were kneaded, polythiol as a curing agent and a silane agent were added and kneaded (mixture A+B+curing agent+silane agent).

In Example 11, the epoxy resin as the main agent and the solid basic compound as the catalyst were kneaded to obtain a mixture A, and after 12 hours, the mixture A, polythiol, a silica filler and a silane agent were kneaded to obtain a mixture C.

In Example 12 and Comparative Examples 1 and 2, all the materials were kneaded simultaneously.

The kneading of the epoxy resin as the main agent and the chixo agent was performed in a vacuum of 1000 rpm for 2 minutes in HIVIS MIX model 3 manufactured by Primix Corporation, and the kneading of other than the epoxy resin and the chixo agent was performed in a vacuum of 600 rpm for 5 minutes.

<Evaluation Method of Sealing Material>

The sealing materials formed using the compositions of Examples 1 to 12 and Comparative Examples 1 and 2 were evaluated in the following six types. The evaluation results are illustrated in Table 1.

Insulation

The compositions of Examples 1 to 12 and Comparative Examples 1 and 2 were placed in a mold and allowed to leave at room temperature for one day or more to be cured. The obtained cured product was taken out from the mold and used as an evaluation sample for the sealing material. The volume resistivity of the evaluation sample was measured. The volume resistivity was determined by the test method ISO2951 and the applied voltage of 500 V.

Ink Resistance

The evaluation sample was immersed in an ink (water:organic solvent:surfactant=75:25:1) having a mass ratio of 20 times the mass ratio of the evaluation sample and heated at 105° C. for 10 hours. This ink does not contain a coloring material for evaluation purposes. The mass of the evaluation sample before and after heating was measured, and the ink absorption rate was determined based on the mass of the evaluation sample before heating.

Durability

The compositions of Examples 1 to 12 and Comparative Examples 1 and 2 were poured into the portion of the sealing material 5 of the ink jet recording head 1 illustrated in FIG. 1 using a dispenser so as to prevent bubbles from entering. The compositions were left for one day or more to cure the compositions. The obtained ink jet recording head was subjected to a durability test by rubbing the ink jet recording head with a blade (made of acrylonitrile butadiene rubber) 1000 times, and the presence or absence of scratches or scrapes on the surface of the sealing material after the durability test was confirmed with an optical microscope.

Elastic Modulus

Using the above evaluation sample, the elastic modulus (F) and tan δ were measured by a dynamic viscoelasticity measuring device DMS6100 (manufactured by Seiko Instruments Inc) in a tensile mode with a sample-to-sample length of 15 mm, a measurement frequency of 1 Hz, and a measurement temperature range of 20° C. to 120° C. at a heating rate of 2° C./min.

Pot Life

The pot life was calculated as the time until the viscosity became twice the initial viscosity.

The determination was as follows.

⊚: Pot life is 24 hours or more

○: Pot life is 8 hours or more to less than 16 hours x: Pot life is less than 8 hours Viscosity The resin compositions prepared in Examples 1 to 18 and Comparative Examples 1 and 2 were measured using a viscometer "TV-20" (manufactured by Toki Sangyo Co., Ltd.).

<Evaluation of Sealing Material>

Examples 1 to 4 and 8

In Examples 1 to 4, although the main sealing performance and storage stability were excellent, a difference in viscosity was observed, and the viscosity was the lowest at the level where A-187 was added to the silane agent of Example 2. It is considered that this is because the effect of adding a silane agent having a low molecular weight to the hydrogenated bisphenol A type epoxy resin, which is an alicyclic epoxy, was obtained. In Example 8, the main sealing performance and storage stability were similar to those in Examples 1 to 4, but the surface of the molded sample was glossy and excellent in flatness as compared with the other examples.

Example 5

Although the main sealing performance and storage stability were excellent, a difference that the viscosity was slightly higher and the ink resistance was lowered as compared with Example 2 was observed. It is considered that this is due to the use of thiol having an ester structure.

Examples 6 and 7

Although the main sealing performance was excellent, a difference in ink resistance and storage stability as compared with Example 2 was observed. It is considered that this is due to the use of thiol having an ester structure.

Examples 9 and 13

Although the main sealing performance was excellent, the storage stability was slightly lower than the storage stability of Example 2. It is considered that this is because the reactivity at the time of storage was improved by increasing the amount of the solid basic compound.

Example 10

Although the main sealing performance and storage stability were excellent, a difference in viscosity was observed, and the viscosity was higher than the viscosity of Example 2. It is considered that this is because the effect of using the hydrogenated bisphenol A type epoxy resin was obtained.

Example 11

Although the main sealing performance and storage stability were excellent, a difference in viscosity was observed, and the viscosity was higher than the viscosity of Example 2. This is due to the difference in the mixing method, and it is considered that the silica filler is not sufficiently mixed with other materials.

Example 12

Although the main sealing performance was excellent, differences in storage stability and viscosity were observed. Example 12 had a higher viscosity and lower storage stability than the viscosity and the storage stability of Example 2. This is due to the difference in the mixing method, and it is considered that the mixing condition of the silica filler and the coating property of the epoxy resin on the solid basic compound were low.

Example 14

The main sealing performance was excellent, and the initial viscosity was also suppressed. This is considered to be due to the increase in the amount of silane agents and solid basic compounds.

Comparative Examples 1 and 2

In Comparative Examples 1 and 2, since the aromatic epoxy resin was used, the sealing performance was inferior to the sealing performance of Examples 1 to 12, and the result was that the function as a sealing material was not satisfied.

TABLE 1

| Item | | Product name | Material name | 1 | 2 | 3 | 4 | 5 | 6 | 7 |
|---|---|---|---|---|---|---|---|---|---|---|
| Main agent (parts) | Epoxy resin | JER YX8000 | Manufactured by Mitsubishi Chemical Corporation | Post-hydrogenated Bis-A | 10 A 90 B | 10 A 90 B | 10 A 90 B | 10 A 90 B | 10 A 90 B | 10 A 90 B | 10 A 90 B |
| | | RXE21 | Manufactured by Mitsubishi Chemical Corporation | Pre-hydrogenated Bis-A | | | | | | | |
| | | jER 828 | Manufactured by Mitsubishi Chemical Corporation | Bis-A | | | | | | | |
| Curing agent (parts) | Polythiol | PEPT | Manufactured by SC Organic Chemical Co., Ltd. | Trifunctional thiol ester type | 60 | 60 | 60 | 60 | | 60 | 60 |
| | | TMMP | Manufactured by SC Organic Chemical Co., Ltd. | Trifunctional thiol ester type | | | | | 60 | | |
| Curing catalyst (parts) | Solid basic compound | PN40J | Manufactured by Ajinomoto Fine Techno Co., Ltd. | Epoxy amine adduct | 2 B | 2 B | 2 B | 2 B | 2 B | 2 B | 2 B |
| Silica filler (parts) | | FB-5D | Manufactured by Denka Company Limited | Fused silica | 500 A | 500 A | 500 A | 500 A | 500 A | 100 A | |
| | | SO-E2 | Manufactured by Admatechs Company Limited | Surface-treated silica | | | | | | | |
| Silane agent (parts) | | A-186 | Manufactured by Momentive Performance Materials | Alicyclic epoxy system | 5 | | | | 5 | 5 | 5 |
| | | A-187 | Manufactured by Momentive Performance Materials | Glycidyl system | | | 5 | | | | |
| | | KR-516 | Manufactured by Shin-Etsu Silicone | High molecular weight type | | | | 5 | | | |
| Pigment | | EP6N | | — | 2 | 2 | 2 | 2 | 2 | 2 | 2 |
| Kneading method | | | | Mixture A + B + curing agent (thiol) + silane agent + pigment | | | | | | | |
| Evaluation | | Insulation | | | 2.00E+15 | 2.00E+15 | 2.00E+15 | 2.00E+15 | 2.00E+15 | 2.00E+15 | 2.00E+15 |
| | | Ink resistance | (%) | | 2.5 | 2.6 | 2.6 | 2.6 | 3.2 | 8.3 | 9.8 |
| | | Durability | | | No scratches | No scratches | No scratches | No scratches | No scratches | No scratches | No scratches |
| | | Elastic modulus | (MPa) | | 4000 | 4000 | 4000 | 4000 | 4000 | 800 | 2 |
| | | Viscosity | Pa·s | | 35.2 | 9.2 | 10.3 | 30.2 | 10.5 | 2 | 0.3 |
| | | Pot life | (Time) | | ◉ | ◉ | ◉ | ◉ | ◉ | ○ | ○ |

TABLE 1-continued

| Item | | Product name | | 8 | 9 | 10 | 11 | 12 | 1 | 2 |
|---|---|---|---|---|---|---|---|---|---|---|
| Main agent (parts) | Epoxy resin | JER YX8000 | Manufactured by Mitsubishi Chemical Corporation | 10 A 90 B | 10 A 90 B | | 100 A | 100 | | |
| | | RXE21 | Manufactured by Mitsubishi Chemical Corporation | | | 10 A 90 B | | | | |
| | | jER 828 | Manufactured by Mitsubishi Chemical Corporation | | | | | | 100 | 100 |
| Curing agent (parts) | Polythiol | PEPT | Manufactured by SC Organic Chemical Co., Ltd. | 60 | 60 | 60 | 60 | 60 | | 60 |
| | | TMMP | Manufactured by SC Organic Chemical Co., Ltd. | | | | | | | |
| Curing catalyst (parts) | Solid basic compound | PN40J | Manufactured by Ajinomoto Fine Techno Co., Ltd. | 2 B | 5 B | 2 B | 2A | 2 | 2 | 2 |
| Silica filler (parts) | | FB-5D | Manufactured by Denka Company Limited | | 500 A | 500 A | 500 | 500 | | |
| | | SO-E2 | Manufactured by Admatechs Company Limited | 500 A | | | | | | |
| Silane agent (parts) | | A-186 | Manufactured by Momentive Performance Materials | 5 | 5 | 5 | 5 | 5 | | |
| | | A-187 | Manufactured by Momentive Performance Materials | | | | | | | |
| | | KR-516 | Manufactured by Shin-Etsu Silicone | | | | | | | |
| Pigment | | EP6N | | 2 | 2 | 2 | 2 | 2 | | |
| Kneading method | | | | | | | Mixture A + curing agent (thiol) + filler + silane agent + pigment | | Knead all materials at the same time | |
| Evaluation | | Insulation | | 2.00E+15 | 2.00E+15 | 2.00E+15 | 2.00E+15 | 2.00E+15 | 1.00E+12 | 1.00E+12 |
| | | Ink resistance | | 2.8 | 2.6 | 2.9 | 2.9 | 2.9 | 10.5 | 10.2 |
| | | Durability | | No scratches | No scratches | No scratches | No scratches | No scratches | Minute scratches | Minute scratches |
| | | Elastic modulus | | 4000 | 4000 | 4000 | 4000 | 4000 | 2 | 2 |
| | | Viscosity | | 9.5 | 8.9 | 14.2 | 20.5 | 20.7 | | |
| | | Pot life | | ◎ | ◎ | ◎ | ○ | ○ | ○ | X |

| | | | | Example | |
|---|---|---|---|---|---|
| Item | | Product name | Material name | 13 | 14 |
| Main agent (parts) | Epoxy resin | JER YX8000 | Manufactured by Mitsubishi Chemical Corporation | Post-hydrogenated Bis-A | 10A 90 B | 10A 90 B |
| | | RXE21 | Manufactured by Mitsubishi Chemical Corporation | Pre-hydrogenated Bis-A | | |
| | | jER 828 | Manufactured by Mitsubishi Chemical Corporation | Bis-A | | |

| Item | | Product name | Material name | Example 13 | Example 14 |
|---|---|---|---|---|---|
| Curing agent (parts) | Polythiol | PEPT | Manufactured by SC Organic Chemical Co., Ltd. | Trifunctional thiol ether type | 60 | 90 |
| | | TMMP | Manufactured by SC Organic Chemical Co., Ltd. | Trifunctional thiol ester type | | |
| Curing catalyst (parts) | Solid basic compound | PN40J | Manufactured by Ajinomoto Fine Techno Co., Ltd | Epoxy amine adduct | 10 B | 10 B |
| Silica filler (parts) | | FB-5D | Manufactured by Denka Company Limited | Fused silica | 300 A | 300 A |
| | | SO-E2 | Manufactured by Admatechs Company Limited | Surface-treated silica | | |
| Silane agent (parts) | | A-186 | Manufactured by Momentive Performance Materials | Alicyclic epoxy system | 5 | 50 |
| | | A-187 | Manufactured by Momentive Performance Materials | Glycidyl system | | |
| | | KR-516 | Manufactured by Shin-Etsu Silicone | High molecular weight type | | |
| Pigment | | EP6N | | — | 2 | 2 |
| Kneading method | | | | | Mixture A + B + curing agent (thiol) + silan agent + pigment | |
| Evaluation | | Insulation | | | 2.00E+15 | 2.00E+15 |
| | | Ink resistance | | (%) | 2.4 | 2.3 |
| | | Durability | | | No scratches | No scratches |
| | | Elastic modulus | | (MPa) | 600 | 500 |
| | | Viscosity | | Pa · s | 1.3 | 1.2 |
| | | Pot life | | (Time) | ◎ | ◎ |

In Table 1, for example, the fact that the column of post-hydrogenated Bis-A of Example 1 is "10 A 90 B" means that the blending amount of post-hydrogenated Bis-A is 10 for the mixture A and 90 for the mixture B, and the fact that the column of the epoxy amine adduct is "2 B" means that the blending amount of the epoxy amine adduct is 2 in the mixture B.

Examples 15 to Examples 18

<Preparation of Composition for Sealing Material>

Table 2 illustrates the materials used in Examples and Comparative Examples and the composition ratios of the materials.

In Examples 15 and 16, a hydrogenated bisphenol A type epoxy resin as a main agent and a solid basic compound as a catalyst are kneaded to obtain a mixture A. Within 1 hour, a mixture B in which the same epoxy resin and silica filler were kneaded, polythiol as a curing agent, and a silane agent were added and kneaded (mixture A+B+curing agent+silane agent).

Examples 17 and 18, a hydrogenated bisphenol A type epoxy resin as a main agent and a solid basic compound as a catalyst were kneaded to obtain a mixture A. After 12 hours, a mixture B in which the same epoxy resin and silica filler were kneaded, polythiol as a curing agent, and a silane agent were added and kneaded (mixture A+B+curing agent+silane agent).

The kneading of the epoxy resin as the main agent and the chixo agent was performed in a vacuum of 1000 rpm for 2 minutes in HIVIS MIX model 3 manufactured by Primix Corporation, and the kneading of the epoxy resin and the non-chixo agent was performed in a vacuum of 600 rpm for 5 minutes.

<Evaluation Method of Sealing Materials>

The sealing materials formed using the compositions of Examples 15 to 18 were evaluated as follows. The evaluation results are illustrated in Tables 3 and 4.

Pot Life

The pot life was calculated as the time until the viscosity became twice the initial viscosity.

The determination was as follows.

○: Pot life is 4 hours or more

Δ: Pot life is less than 4 hours

The resin compositions prepared in Examples 1 and 2 and Comparative Examples 1 and 2 were measured using a viscometer "TV-20" (manufactured by Toki Sangyo Co., Ltd.).

Curing Time

The curing time was defined as the time required for curing at room temperature.

The determination was as follows.
○: No tackiness at room temperature for 30 hours
Δ: Tacky at room temperature for 30 hours
Reaction Rate
The reaction rate at room temperature for 30 hours was confirmed by differential scanning calorimetry (DSC).
<Evaluation of Sealing Material>

Example 15

Figure 3:
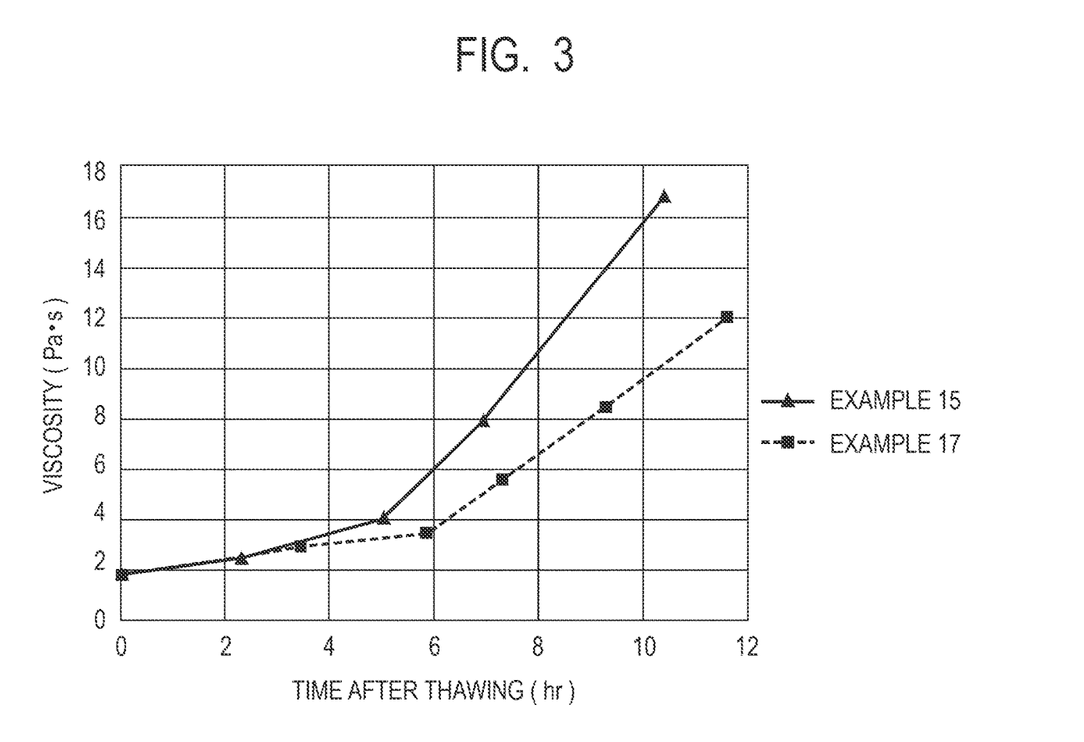
FIG. 3 illustrates changes in viscosity due to a passage of time in Example 15 and Example 17.

In Example 15, it was found that the viscosity increased rapidly with the passage of time as compared with Example 17 as illustrated in FIG. 3, and a high reaction rate at room temperature for 30 hours as illustrated in Table 3. It is considered that this is because the reactivity was improved by mixing the polythiol within 1 hour after preparing the mixture A.

Example 16

The initial viscosity was suppressed as compared with Example 16. This is considered to be due to the increase in the amount of silane agents and solid basic compounds.

Examples 17 and 18

Examples 17 and 18, the storage stability is excellent, but the curing time is longer than that in Examples 15 and 16.

TABLE 3-continued

|  | Pot life | Curing time |
|---|---|---|
| Example 17 | ○ | Δ |
| Example 18 | ○ | Δ |

TABLE 4

|  | Reaction rate |
|---|---|
| Example 15 | 96% |
| Example 17 | 79% |

According to the present disclosure, there is provided an ink jet recording head sealed with a sealing material having a sealing property, moldability and productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-075768, filed Apr. 28, 2021, and Japanese Patent Application No 2022-058992, filed Mar. 31, 2022 which are hereby incorporated by reference herein in their entirety.

TABLE 2

| Item | | Product name | Material name | Example 15 | Example 16 | Example 17 | Example 18 |
|---|---|---|---|---|---|---|---|
| Main agnet (parts) | Epoxy resin | JER YX8000 | Manufactured by Mitsubishi Chemical Corporation | Post-hydrogenated Bis-A | 10 A 90 B | 10 A 90 B | 10 A 90 B | 10 A 90 B |
| Curing agnet (parts) | Polythiol | PEPT | Manufactured by SC Organic Chemical Co., Ltd. | Trifunctional thiol ether type | 60 | 90 | 60 | 90 |
| Curing catalyst (parts) | Solid basic compound | PN40J | Manufactured by Ajinomoto Fine-Techono Co., Ltd | Epoxy amine adduct | 10B | 10B | 10B | 10B |
| Silica filler (parts) | | FB-5D | Manufactured by Denka Company Limited | Fused silica | 300 A | 300 A | 300 A | 300 A |
| Silane agent (parts) | | A-186 | Manufactured by Momentive Performance Materials | Alicyclic epoxy system | 5 | 50 | 5 | 50 |
| Pigment | | EP6N | — | — | 2 | 2 | 2 | 2 |
| Keading method | | | | | Mixture A + B + curing agent (thiol) + silane agent + pigment B is mixed within 1 hour after preparation of A | | Mixture A + B + curing agent (thiol) + silane agent + pigment A is left for 12 hours after preparation of A | |

In Table 1, for example, the fact that the column of post-hydrogenated Bis-A of Example 1 is "10 A 90 B" means that the blending amount of post-hydrogenated Bis-A is 10 for the mixture A and 90 for the mixture B, and the fact that the column of the epoxy amine adduct is "10 B" means that the blending amount of the epoxy amine adduct is 10 in the mixture B.

TABLE 3

|  | Pot life | Curing time |
|---|---|---|
| Example 15 | ○ | ○ |
| Example 16 | ○ | ○ |

What is claimed is:
1. An ink jet recording head that includes a substrate having an ejection orifice for ejecting a liquid and a member provided with a recessed portion for accommodating the substrate, the head comprising:
a gap formed between a wall of the recessed portion of the member and the substrate; and
a sealing material that seals the gap,
wherein the sealing material contains a cured product of a composition containing at least a hydrogenated bis- phenol A type epoxy resin, a solid basic compound, a polythiol, and a silane agent having an alicyclic epoxy skeleton.

2. The ink jet recording head according to claim 1, wherein a viscosity of the composition is 40 Pa·s or less.

3. The ink jet recording head according to claim 1, wherein a molecular weight of the silane agent is 300 or less.

4. The ink jet recording head according to claim 1, wherein a content of the silane agent is 1 to 50 parts by mass with respect to 100 parts by mass of the hydrogenated bisphenol A type epoxy resin.

5. The ink jet recording head according to claim 1, wherein an elastic modulus of the sealing material is 20 GPa or less.

6. The ink jet recording head according to claim 1, wherein the solid basic compound is an amine adduct-based latent curing agent.

7. The ink jet recording head according to claim 1, wherein the polythiol is an ether-type polyfunctional thiol.

8. The ink jet recording head according to claim 7, wherein the polythiol is contained in such an amount that a thiol equivalent of the polythiol is 0.5 to 1 equivalent with respect to epoxy 1 equivalent of the hydrogenated bisphenol A type epoxy resin.

9. The ink jet recording head according to claim 1, wherein the composition contains a silica filler.

10. The ink jet recording head according to claim 9, wherein the particle diameter of the silica filler is 0.1 μm or more.

11. The ink jet recording head according to claim 9, wherein the silica filler is treated with silane.

12. The ink jet recording head according to claim 1, wherein a content of the solid basic compound is 1.5 to 2.5 parts by mass with respect to 100 parts by mass of the hydrogenated bisphenol A type epoxy resin.

13. The ink jet recording head according to claim 1, wherein the hydrogenated bisphenol A type epoxy resin is a post-hydrogenated bisphenol A type epoxy resin.

14. The ink jet recording head according to claim 1, wherein the polythiol is a trifunctional thiol.

15. The ink jet recording head according to claim 14, wherein the polythiol is at least one selected from the group consisting of pentaerythritol trispropanethiol, trimethylolpropane tris (3-mercaptopropionate), and pentaerythritol tetrakis (3-mercaptopropionate).

16. The ink jet recording head according to claim 1, wherein a content of the silane agent is 50 to 75 parts by mass with respect to 100 parts by mass of the hydrogenated bisphenol A type epoxy resin.

17. The ink jet recording head according to claim 1, wherein a content of the solid basic compound is 2.5 to 10 parts by mass with respect to 100 parts by mass of the hydrogenated bisphenol A type epoxy resin.

18. The ink jet recording head according to claim 17, wherein a content of the silane agent is 50 to 75 parts by mass with respect to 100 parts by mass of the hydrogenated bisphenol A type epoxy resin.

\* \* \* \* \*